(12) United States Patent
Li et al.

(10) Patent No.: US 12,217,164 B2
(45) Date of Patent: Feb. 4, 2025

(54) NEURAL NETWORK AND ITS INFORMATION PROCESSING METHOD, INFORMATION PROCESSING SYSTEM

(71) Applicant: Tsinghua University, Beijing (CN)

(72) Inventors: Xinyi Li, Beijing (CN); Huaqiang Wu, Beijing (CN); He Qian, Beijing (CN); Bin Gao, Beijing (CN); Sen Song, Beijing (CN); Qingtian Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1200 days.

(21) Appl. No.: 16/964,435

(22) PCT Filed: Feb. 24, 2018

(86) PCT No.: PCT/CN2018/077087
§ 371 (c)(1),
(2) Date: Jul. 23, 2020

(87) PCT Pub. No.: WO2019/144453
PCT Pub. Date: Aug. 1, 2019

(65) Prior Publication Data
US 2021/0049448 A1    Feb. 18, 2021

(30) Foreign Application Priority Data
Jan. 24, 2018    (CN) .......................... 201810069603.5

(51) Int. Cl.
*G06N 3/06*        (2006.01)
*G06N 3/049*       (2023.01)
(Continued)

(52) U.S. Cl.
CPC ............. *G06N 3/065* (2023.01); *G06N 3/049* (2013.01); *G06N 3/084* (2013.01)

(58) Field of Classification Search
CPC ..................................................... G06N 3/061
See application file for complete search history.

(56) References Cited

U.S. PATENT DOCUMENTS

| 5,218,529 A | * | 6/1993 | Meyer | ...................... G06N 3/02 706/924 |
| 2012/0011090 A1 | * | 1/2012 | Tang | ...................... G06N 3/088 706/33 |

(Continued)

FOREIGN PATENT DOCUMENTS

| CN | 105160401 | 12/2015 |
| CN | 105224986 | 1/2016 |
| CN | 107122828 | 1/2017 |

OTHER PUBLICATIONS

X. Wu, V. Saxena and K. Zhu, "Homogeneous Spiking Neuromorphic System for Real-World Pattern Recognition," in IEEE Journal on Emerging and Selected Topics in Circuits and Systems, vol. 5, No. 2, pp. 254-266, Jun. 2015 (Year: 2015).*

(Continued)

*Primary Examiner* — James D. Rutten
(74) *Attorney, Agent, or Firm* — Scully, Scott, Murphy & Presser, P.C.

(57) ABSTRACT

A neural network and its information processing method, information processing system. The neural network includes N layers of neuron layers connected to each other one by one, except for a first layer of neuron layer, each of the neurons of the other neuron layers includes m dendritic units and one hippocampal unit; the dendritic unit includes a resistance value graded device, the hippocampal unit includes a resistance value mutation device, and the m dendritic units can be provided with different threshold voltage or current, respectively; and the neurons on the nth layer neuron layer are connected to the m dendritic units of the neurons on the n+1th layer neuron layer; wherein N is an (Continued)

integer larger than 3, m is an integer larger than 1, n is an integer larger than 1 and less than N.

11 Claims, 8 Drawing Sheets

(51) Int. Cl.
    *G06N 3/065*     (2023.01)
    *G06N 3/084*     (2023.01)

(56) References Cited

U.S. PATENT DOCUMENTS

| | | | |
|---|---|---|---|
| 2015/0356267 A1* | 12/2015 | Kim | G06F 17/10 |
| | | | 703/2 |
| 2018/0174034 A1* | 6/2018 | Obradovic | H01L 29/42324 |
| 2018/0307946 A1* | 10/2018 | Kuroda | G06F 16/48 |
| 2018/0336362 A1* | 11/2018 | Guttmann | G06N 5/046 |

OTHER PUBLICATIONS

International Search Report issued in corresponding International Application No. PCT/CN2018/077087 on Sep. 29, 2018, 4 pages.

* cited by examiner

NEURAL NETWORK AND ITS INFORMATION PROCESSING METHOD, INFORMATION PROCESSING SYSTEM

CROSS-REFERENCE TO RELATED APPLICATIONS

The present application is the national stage entry of International Patent Application No. PCT/CN2018/077087, filed on Feb. 24, 2018, and claims priority to Chinese patent application No. 201810069603.5, filed on Jan. 24, 2018, the entire disclosures of which are incorporated herein by reference as part of the present application.

TECHNICAL FIELD

Embodiments of the present disclosure relate to a neural network, an information processing method and an information processing system.

BACKGROUND

With a rapid development of information technology, neural networks have achieved remarkable results in many fields such as speech recognition and image recognition, etc. However, with a continuous enhancement of the capabilities of neural networks, demands for computing resources are also increasing. Information processing capabilities of Von Neumann architectures in which data processing units are separated from data storage units, has lagged far behind the speed of information emergence, which has become a bottleneck restricting the development of the Von Neumann architectures. Therefore, under an inspiration of biological neural networks, distributed information processing systems (i.e. artificial neural networks), in which data processing units are merged with data storage units, have become one of the most effective ways to solve the bottleneck of data processing in the Von Neumann architectures.

SUMMARY

At least an embodiment of the present disclosure provides a neural network, which comprises: N neuron layers connected one by one, and except for a first neuron layer, each neuron in other neuron layers comprises m dendrite units and one soma unit. The dendrite units each comprises a resistance gradient element, the soma unit comprises a resistance mutation element, and the m dendrite units are configured with different threshold voltages or currents respectively; and neurons in an n-th neuron layer are respectively connected to the m dendrite units of each neuron in an (n+1)th neuron layer; N is an integer greater than or equal to 2, m is an integer greater than 1, n is an integer greater than or equal to 1 and less than N.

For example, in the neural network provided by an embodiment of the present disclosure, the m dendrite units are connected in various series-parallel connection and then connected in series with the soma unit.

For example, in the neural network provided by an embodiment of the present disclosure, outputs of the m dendrite units conform to the following function:

$$y = \begin{cases} x, & a = 0 \\ \dfrac{e^{ax}-1}{e^{a}-1}, & a > 0 \end{cases}$$

where a denotes a nonlinear coefficient, which comprises a threshold voltage or current of the dendrite unit.

For example, in the neural network provided by an embodiment of the present disclosure, an output oscillation frequency of the soma unit conforms to the following function:

$$y = \begin{cases} 2*\text{sigmoid}(x-c)-1, & x > c \\ 0, & x \le c \end{cases}$$

where c denotes a threshold voltage or current of the soma unit, the sigmoid function is defined as:

$$g(z) = \dfrac{1}{1+e^{-z}}$$

where $z = x - c$.

For example, in the neural network provided by an embodiment of the present disclosure, the n-th neuron layer is connected to the (n+1)th neuron layer by a synapse unit.

For example, in the neural network provided by an embodiment of the present disclosure, the synapse unit comprises a memristor array.

At least an embodiments of the present disclosure also provides an information processing system, which comprises: the neural network provided by any of the embodiments of the present disclosure, an input unit, an output unit, a back propagation unit and a driver. The input unit is configured to process data signals into input signals required by the neural network; the output unit is configured to process an output outputted by the neural network and send a process result to the back propagation unit; the back propagation unit is configured to optimize parameters of a synapse unit of the neural network; the driver is configured to apply voltage signals to the neural network via signal lines.

At least an embodiments of the present disclosure also provides an information processing method of the neural network provided by any embodiments of the present disclosure, which comprises: dividing input signals of each neuron in the (n+1)th neuron layer into m groups, and sending the m groups of input signals to the m dendrite units of each neuron respectively; performing a nonlinear filtering operation on the m groups of input signals through the m dendrite units; performing a data processing on the input signals after performing of the nonlinear filtering operation, and then sending the input signals after performing of the data processing to the soma unit for a further data processing.

For example, in the information processing method provided by an embodiment of the present disclosure, the nonlinear filtering operation comprises: setting threshold voltages or currents for the m dendrite units respectively; in a case where the input signals are greater than the threshold voltages or currents, performing an operation to the input signals; in a case where the input signals are less than the threshold voltages or currents, performing no operation to the input signals.

For example, the information processing method provided by an embodiment of the present disclosure, further comprises: after the soma performs the data processing on outputs of the dendrite units, transmitting signals to an (n+2)th neuron layer through an axon unit.

For example, the information processing method provided by an embodiment of the present disclosure, further comprises: after the dendrite units perform the data processing, turning off the input signals to restore the dendrite units and the soma unit to respective initial states.

For example, the information processing method provided by an embodiment of the present disclosure, further comprises: computing input signals of each neuron in the (n+1)th neuron layer through a synapse unit.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1A:
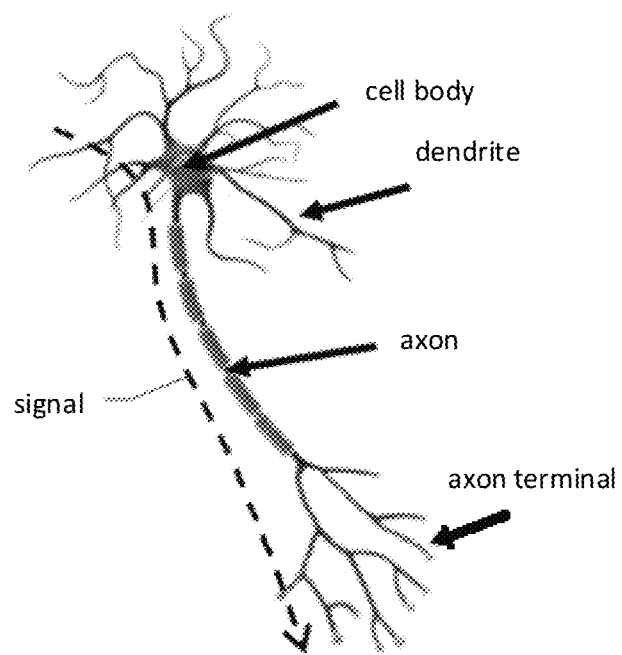
FIG. 1A is a schematic diagram of a biological neuron unit.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not limited to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Hereinafter, various embodiments of the present disclosure will be described in detail with reference to the accompanying drawings. It should be noted that in the accompanying drawings, the same reference numerals are assigned to components with essentially the same or similar structures and functions, and repeated descriptions thereof will be omitted.

For example, a human brain mainly relies on neurons and synapses for information transmission between neurons to achieve information transfer and processing. Neurons are basic units for information processing in a brain nervous system, which can be used to receive, integrate, filter, store and transmit information, etc., so that various functional activities of humans can be carried out regularly to adapt to changes of internal environment and external environment.

Figure 1B:
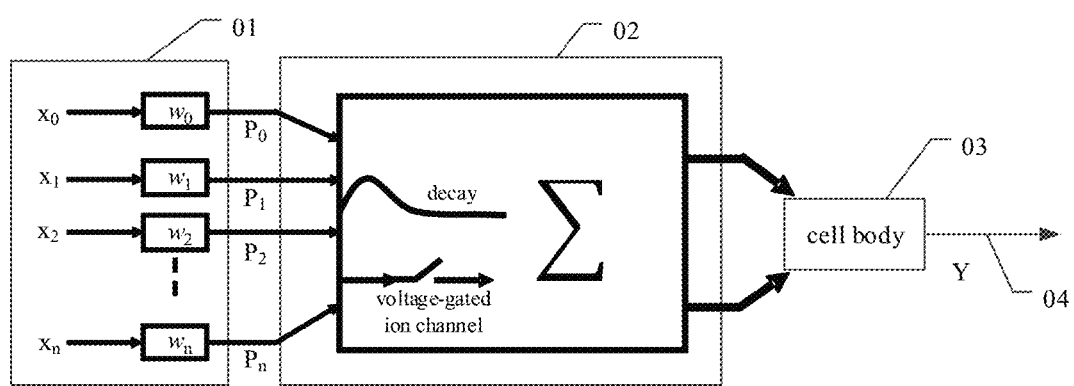
FIG. 1B is a schematic diagram of an information processing model of a neuron.
Figure 1C:
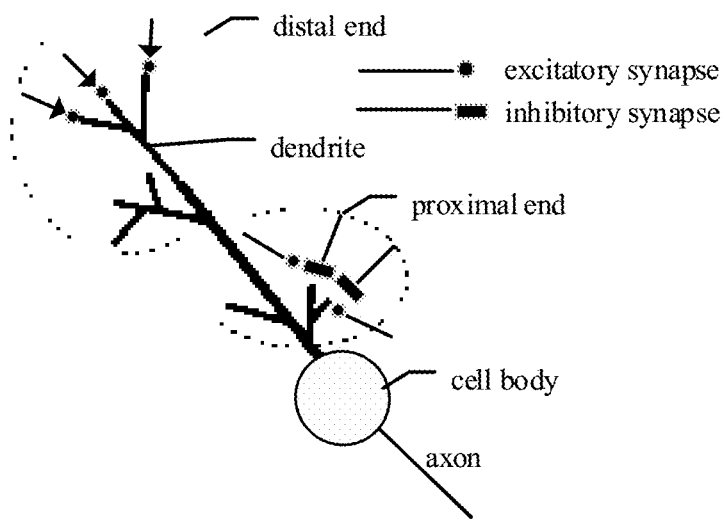
FIG. 1C is a schematic diagram of a dendrite structure.

FIG. 1A shows a biological neuron unit, FIG. 1B shows an information processing model of a neuron, and FIG. 1C shows a dendrite structure.

Neurons are basic components of a neural network, which can transmit information, filter information and integrate information, etc. As shown in FIG. 1A, in the neurons, a signal from one neuron passes through an axon and firstly reaches an axon terminal of the axon, and changes of vesicles in the axon terminal are generated, so that the vesicles release neurotransmitters. The neurotransmitters enter a dendrite of another neuron through a synapse gap, and receptors on the dendrite can receive the neurotransmitters to change permeability of membrane directed ions of a cell body, so that concentration of ions inside and outside the cell membrane can be changed, and thereby potential inside the cell body and potential outside the cell body can be changed. Therefrom, information is transmitted from one neuron to another. In a process of information transmission, some axons can form multiple branches at the axon terminal. Potential actions from trunk of the axons can continue to transmit on each branch at the same time, and finally reach different target neurons, so that communications among multiple neuron can be achieved through the axons. On the other hand, in the structure of a neural network, branches of axon terminals from different neurons can reach the dendrites of a same neuron and form a large number of synapses, and neurotransmitters released from different synapses can affect changes of membrane potential of the cell body of the same neuron, so a neuron can integrate input information from different sources. On another hand, in neurons, the release of neurotransmitters in the synapses and the changes of membrane potential of the cell body are continuous. When the membrane potential is higher than a certain threshold, the input information is transmitted by the axon; when the membrane potential is lower than the threshold, the input information cannot be transmitted, so a neuron can realize the function of filtering information.

A neuron is an information processing unit with multi-input and single-output, which process information in a nonlinear way. Based on function and characteristics of a neuron, it can be abstracted into a simple mathematical model. As shown in FIG. 1B, in a neuron, x0, x1, x2, . . . , xn are signals transmitted by axons of a plurality of previous neurons, w0, w1, w2, . . . , wn are transmission efficiencies of a synapse 01, input signals P0, P1, P2, . . . , Pn of the neuron are formed after x0, x1, x2, . . . , xn go through the synapse 01, and the input signals are transmitted a dendrite 02; then, the dendrite 02 and a cell body 03 process the input signals and an output signal Y is obtained. The output signal Y is finally transmitted to an axon 04 of the neuron, and the axon 04 can transmit the output signal Y to other neurons.

When a neuron receives information from other neurons, the dendrite 02 has a function of a threshold function, which can be defined by the following formula:

$$\text{channel} = \begin{cases} 0, & P < \theta \\ 1, & P \geq \theta \end{cases}.$$

When a value of an input signal is greater than a threshold $\theta$, the value of channel is 1, so that a voltage-gated ion channel in the dendrite 02 is turned on, and the input signal can be transmitted to the cell body 03; when the value of the input signal is less than the threshold $\theta$, the value of channel is 0, so that the voltage-gated ion channel in the dendrite 02 is turned off, the input signal is attenuated during the transmission in the dendrite 02 and cannot be transmitted to the cell body 03. When the cell body 03 receives the input signal transmitted by the dendrite 02, the membrane potential of the cell body 03 gradually changes with time. When the change of the membrane potential exceeds a certain threshold, the cell body 03 generates an abrupt rising pulse signal, which is the output signal of the neuron. Then, the pulse signal is transmitted to other neurons along the axon 04, thus completing the information transfer of the neuron.

As shown in FIG. 1C, according to neuron theory, 15% dendrites are located at a proximal end near the cell body and carry inhibitory synapses and excitatory synapses; the remaining 85% dendrites are located at a distal end away from the cell body and carry only excitatory synapses. The inhibitory synapses have a counteracting effect on the excitatory synapses on dendrites located at the distal end away from the cell body, and the inhibitory synapses do not play a role in input signals. Therefore, an excitatory synaptic potential generated in the dendrites can be expressed by superimposing all excitatory synapses greater than the threshold $\theta$, which can be defined by the following formula:

$$D_{ex} = \Sigma_{i=1}{}^n P_i + \Sigma_{j=1}{}^n P_j + \ldots + \Sigma_{k=1}{}^n P_k$$

where i, j and k denote the number of excitatory synaptic input. $D_{ex}$ denotes the generated excitatory synaptic potential.

The neuron transmits, filters and integrates the input signals to form the output signal Y, and then transmits the output signal Y to other neurons through the axon. The output signal Y can be defined by the following formula:

$$Y = D_{ex\text{-}upstream} - D_{inhibit} + D_{ex\text{-}downstream}$$

where $D_{ex\text{-}upstream}$ denotes the excitatory synaptic potential generated by upstream dendrites, $D_{inhibit}$ denotes the inhibitory synaptic potential received by the cell body, and $D_{ex\text{-}downstream}$ denotes the excitatory synaptic potential generated by downstream dendrites.

An artificial neural network is a computer system that simulates the interconnection of brain neurons through synapses, which can be widely applied in the fields such as image recognition, automatic control, predictive estimation, and data analysis. The artificial neural network mainly uses spatially distributed neuron-like electronic elements and synapse-like electronic elements to transform input signals into output signals nonlinearly. The artificial neural network can process information in parallel in dense interconnected structures, which has characteristics such as nonlinearity, self-adaptability and a fast processing speed, etc.

The artificial neural network mainly comprises two parts: neurons and synapses. The neurons are primarily responsible for the processing of information; the synapses are primarily responsible for the storage of data. At present, the function of the neurons in the artificial neural network is only to integrate the received signals and send pulse signals when the integration reaches a certain degree. Because the function of this information processing units is too simple, when dealing with a slightly more complicated task, it is necessary to increase a size of the network (i.e. increase the number of data processing units and data storage units). Therefore, this will greatly increase the demand of the artificial neural network for hardware resources, thereby resulting in a rise in cost and power consumption.

At least an embodiment of the present disclosure provides a neural network, which comprises: N neuron layers connected one by one, except for a first neuron layer, each neuron in other neuron layers comprises m dendrite units and one soma unit. The dendrite unit comprises a resistance gradient element, the soma unit comprises a resistance mutation element, and the m dendrite units are set with threshold voltages or currents respectively; and neurons in an n-th neuron layer are respectively connected to the m dendrite units of each neuron in an (n+1)th neuron layer; N is an integer greater than or equal to 2, m is an integer greater than 1, n is an integer greater than or equal to 1 and less than N.

At least an embodiment of the present disclosure also provides an information processing method corresponding to the neural network and an information processing system comprising the neural network.

The neural network, the information processing method of the neural network and the information processing system provided by the embodiments of the present disclosure can set different threshold parameters according to different requirements, so as to filter out non-critical information irrelevant to the target task, and only process critical information, thereby decreasing the amount of information processing of the neural network, reducing power consumption during the neural network is operated, and improving processing efficiency of the neural network for the critical information.

Exemplary embodiments of the present disclosure will be described in detail below with reference to the accompanying drawings.

Figure 2A:
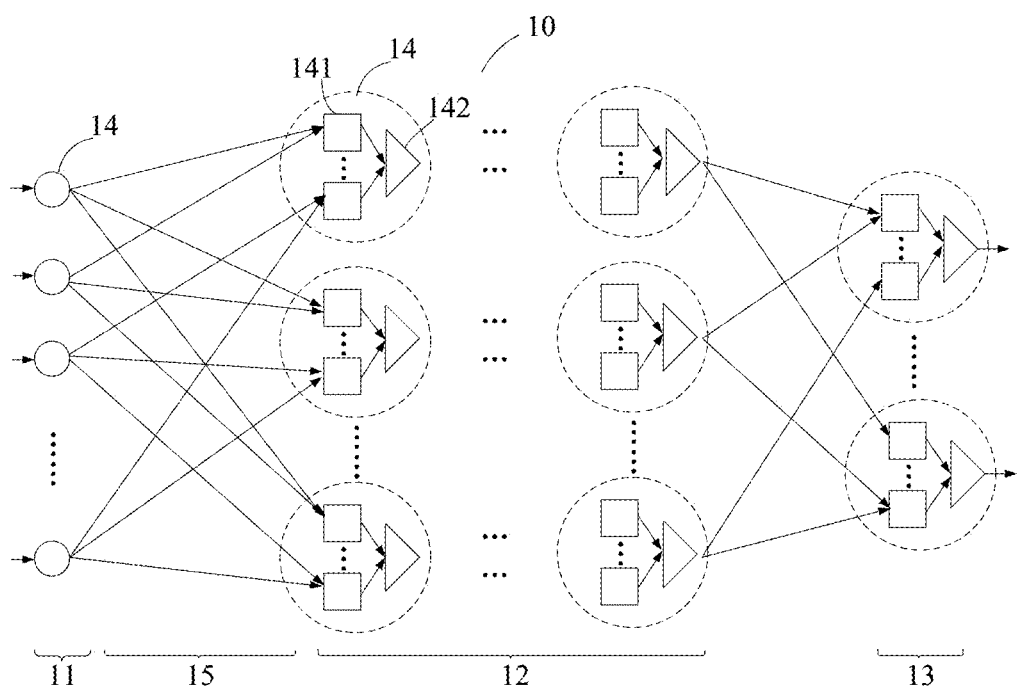
FIG. 2A is a schematic diagram of a neural network 10 provided by some embodiments of the present disclosure.

As shown in FIG. 2A, the neural network 10 comprises an input layer 11, at least one hidden layer 12, and an output layer 13. For example, the neural network 10 comprises N neuron layers connected one by one (N is an integer greater than or equal to 2). For example, the input layer 11 comprises a first neuron layer, the at least one hidden layer 12 comprises a second neuron layer to an (N−1)th neuron layer, and the output layer 13 comprises an N-th neuron layer. For example, the input layer 11 transmits the received input data to the at least one hidden layer 12, and the at least one hidden layer 12 performs layer-by-layer computation and conversion on the input data and send the input data after the layer-by-layer computation and conversion to the output layer 13, and the output layer 13 outputs an output result of the neural network 10. For example, as shown in FIG. 2A, structures between the layers of the neural network 10 are fully connected structures.

For example, as shown in FIG. 2A, the input layer 11, the at least one hidden layer 12, and the output layer 13 all comprise a plurality of neurons 14, and the number of neurons 14 in each layer can be set according to different application conditions. For example, when there are M (M is an integer greater than 1) input data, there are M neurons 14 in the input layer 11.

For example, as shown in FIG. 2A, except for the first neuron layer (i.e., the input layer), each neuron 14 in other neuron layers (i.e., the hidden layer 12 and the output layer 13) comprises m (m is an integer greater than 1) dendrite units 141 and one soma unit 142. For example, the m dendrite units 141 can be connected in different series and/or parallel combinations and connected in series with the soma unit 142. For example, as shown in FIG. 2A, the m dendrite units 141 are connected in parallel and connected in series with the one soma unit 142, respectively. For example, outputs of the m dendrite units 141 can be respectively sent to the soma unit 142 for a further processing of data. It should be noted that, the amount of the dendrite units 141 in each neuron 14 of the hidden layer 12 and the output layer 13 can be the same or different, which is depended on a specific situation, and is not limited herein.

For example, in the neural network 10, the neurons 14 in an n-th (n is an integer greater than or equal to 1 and less than N) neuron layer are respectively connected to the m dendrite units of each neuron 14 in an (n+1)th neuron layer. As shown in FIG. 2A, the first neuron layer comprises, for example, q (q is an integer greater than 1) neurons 14, and then each neuron 14 in the second neuron layer can comprises q input signals. For example, the q input signals may be equally distributed to the m dendrite units 141. As shown in FIG. 2A, for example, two input signals can be distributed to each dendrite unit, then a first dendrite unit 141 can be connected with a first neuron 14 and a second neuron 14 in the first neuron layer, a second dendrite unit 141 can be connected with a third neuron 14 and a fourth neuron 14 in the first neuron layer, and so on, a m-th dendrite unit 141 can be connected with a (q−1)th neuron 14 and a q-th neuron 14 in the first neuron layer. It should be noted that, this is not limited in this aspect. For example, the amount of input signals distributed to each dendrite unit can also be different. For example, the first dendrite unit 141 can be connected with three neurons in a previous neuron layer, and the second dendrite unit 141 can be connected with two neurons in the previous neuron layer, etc. The number of input signals of each dendrite unit is depended on a specific situation and is not limited herein.

Figure 2B:
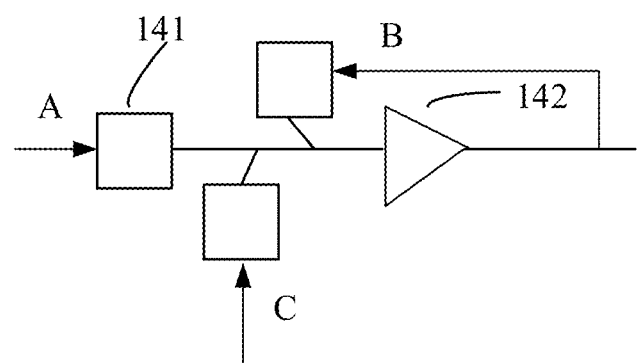
FIG. 2B is a schematic diagram of a hierarchical processing of data by a dendrite unit of the neural network 10 as shown in FIG. 2A.

It should be noted that, for example, as shown in FIG. 2B, the dendrite unit not only processes an input signal A transmitted from the previous neuron layer, but also performs a hierarchical processing on an information B of the same layer and an information C generated in the process of back propagation, simultaneously.

In the present embodiment, the function of processing the input signals in groups is realized by providing a plurality of dendrite units in the neurons, thereby improving the efficiency of signal processing of the neural network 10.

Figure 3:
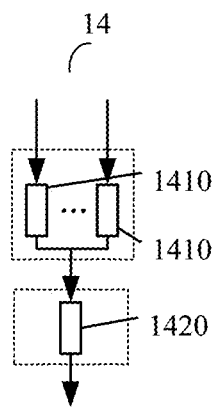
FIG. 3 is a circuit structure diagram of neurons as shown in FIG. 2A.

FIG. 3 shows a circuit structure diagram of the neurons 14 as shown in FIG. 2A. For example, as shown in FIG. 3, the dendrite unit 141 can be implemented as a resistance gradient element 1410, and the soma unit 142 can be implemented as a resistance mutation element 1420. For example, as shown in FIG. 3, the resistance gradient elements 1410 are connected in parallel and connected in series with the resistance mutation element 1420, so that a multi-channel synchronous transmission for signals can be realized. For example, the m dendrite units correspond to m resistance gradient elements 1410, respectively. It should be noted that this is not limited. For example, the dendrite unit 141 can also be implemented by a capacitor and a diode in series, and for example, the soma unit 142 can also be implemented by an oscillating circuit, which are not described herein.

For example, the resistance gradient element 1410 can realize the filtering function of the dendrite unit 141. For example, in an example embodiment, the output of the dendrite unit 141 (i.e., the resistance gradient element) can conform to the following function:

$$y = \begin{cases} x, & a = 0 \\ \dfrac{e^{ax} - 1}{e^{a} - 1}, & a > 0 \end{cases}$$

where a denotes a nonlinear coefficient, which is the threshold voltage or current of the dendrite unit 141.

Figure 4:
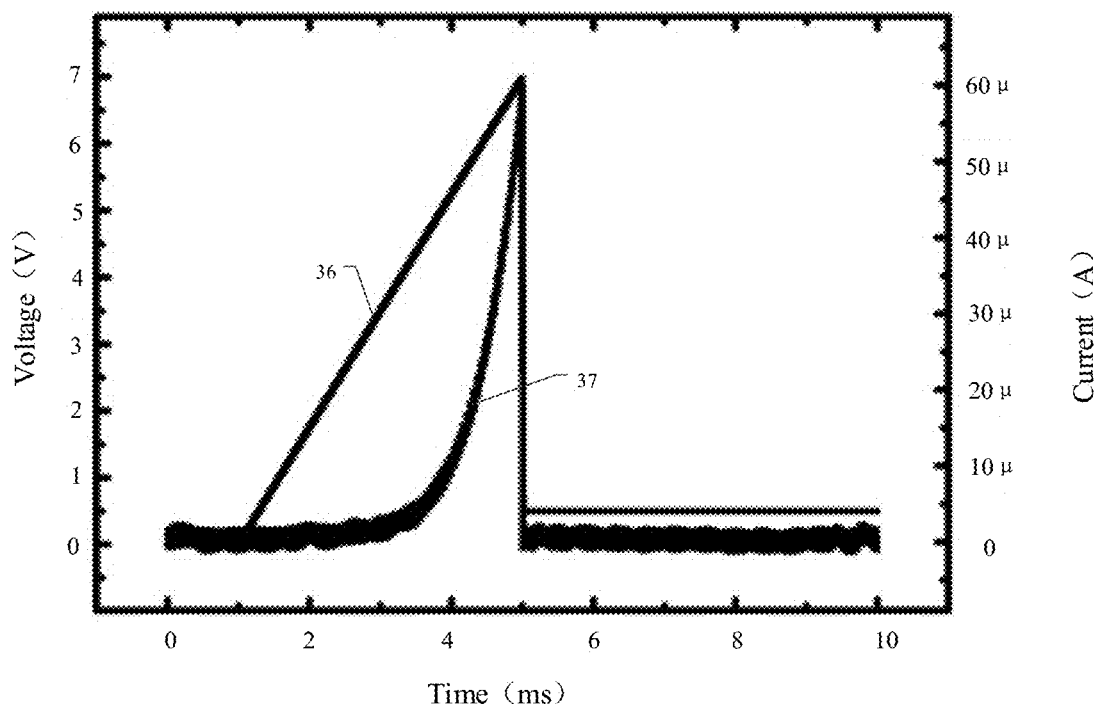
FIG. 4 is a curve graph of electrical characteristics of a resistance gradient element provided by some embodiments of the present disclosure.

FIG. 4 shows a curve graph of electrical characteristics of the resistance gradient element provided by the embodiment of the present disclosure. For example, the nonlinear coefficient a of a resistance gradient element 1410 can be set to 3V, that is, at this time the nonlinear coefficient a denotes the threshold voltage of the dendrite unit 141. For example, as shown in FIG. 4, a voltage signal 36 is applied to the resistance gradient element 1410. When the value of the voltage signal 36 is less than 3 V, a response current 37 of the resistance gradient element 1410 is small (almost 0 EA), and at this time, the circuit unit does not transmit a signal (that is, the response current). When the value of the voltage signal 36 is greater than 3V, the response current 37 of the resistance gradient element 1410 increases sharply, and at this time, the circuit unit starts transmitting the signal. That is to say, when the value of the voltage signal 36 is less than 3V, the circuit unit cannot perform signal transmission, so that the resistance gradient element 1410 can filter the voltage signal whose voltage value is less than 3V, thereby realizing the filtering function of the neuron. It should be noted that the embodiments of the present disclosure are not limited to the aspect. For example, the m dendrite units 141 can be respectively set with a same threshold voltage or current, or can be set with different threshold voltages or currents (i.e., the nonlinear coefficient a). That is, the nonlinear coefficient a of one dendrite unit can be set to, for example, 1 V, and the nonlinear coefficient a of another dendrite unit can be set to, for example, 2 V, etc. The magnitude of the nonlinear coefficient a is depended on actual requirements and is not limited herein.

The neural network 10 provided by the present embodiment can set different threshold voltages or currents for different dendrite units, and set different threshold voltages or currents for a same dendrite unit according to different tasks, so the neural network 10 can realize the function of performing signal processing simultaneously in time and space, thus greatly improving the information processing efficiency of the neural network 10. At the same time, because the dendrite unit filters the irrelevant information, the neural network 10 only needs to process the critical information after being filtered. Therefore, the neural network 10 effectively decreases the amount of information that needs to be processed, thus enabling a data processing with higher accuracy and more complexity for the key information, and further, improving processing efficiency of the key information.

For example, in an example embodiment, an output oscillation frequency of the soma unit conforms to the following function:

$$y = \begin{cases} 2*\text{sigmoid}(x-c)-1, & x > c \\ 0, & x \leq c \end{cases}$$

where x denotes an input signal, c denotes a threshold voltage or current of the soma unit 142, the sigmoid function is defined as:

$$g(z) = \frac{1}{1+e^{-z}}$$

where $z = x - c$.

For example, the oscillation frequency indicates the frequency of which the soma unit transmits a signal, and further indicates the efficiency of the neuron in processing information.

Figure 5:
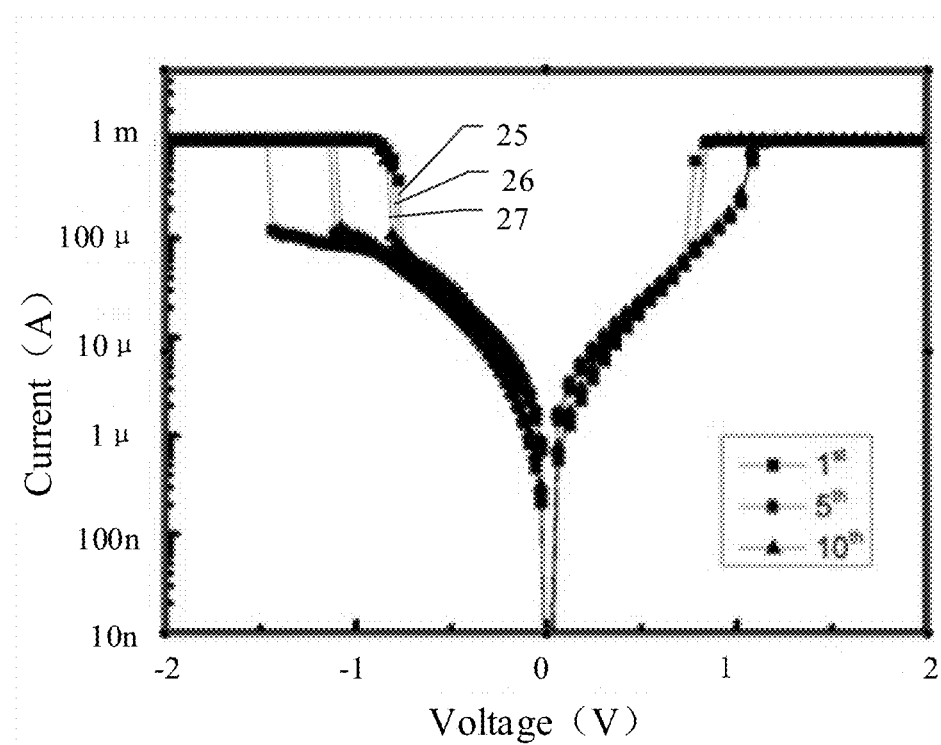
FIG. 5 is a curve graph of electrical characteristics of a resistance mutation element provided by some embodiments of the present disclosure.

FIG. 5 shows a curve graph of electrical characteristics of the resistance mutation element provided by the embodiment of the present disclosure. For example, a voltage signal is applied to the resistance mutation element 1420, the resistance value of the resistance mutation element 1420 remains substantially unchanged until the voltage signal reaches a threshold voltage c of the resistance mutation element 1420. When the voltage signal reaches the threshold voltage c, the resistance value of the resistance mutation element 1420 changes abruptly. A resistance value test is performed on the resistance mutation element 1420, and a curve diagram of a voltage-current of the resistance mutation element 1420 is shown in FIG. 5. Under positive voltages, a forward scanning is performed on the resistance mutation element 1420. When the positive voltage is about 1 V, the resistance value of the resistance mutation element 1420 suddenly decreases. Under negative voltages, a forward scanning is performed on the resistance mutation element 1420. When the negative voltage is about −1 V, the resistance value of the resistance mutation element 1420 suddenly decreases. Curve 25, curve 26, and curve 27 represent a curve graph of the resistance value test on the resistance mutation element 1420 for 1, 5, and 10 times, respectively. As shown in FIG. 5, the resistance mutation element 1420 is subjected to multiple tests of the resistance value, and the resistance mutation element 1420 exhibits the same characteristics, that is, the resistance mutation element 1420 can be used repeatedly and still maintain the same characteristics.

For example, the resistance gradient element 1410 has a first resistance value, and the resistance mutation element 1420 has a second resistance value. When a voltage is not applied to the resistance gradient element 1410 and the resistance mutation element 1420, the first resistance value ranges from 1 to 100 MΩ, and the second resistance value ranges from 1 to 1000 KΩ. The resistance value of the resistance gradient element 1410 differs greatly from the resistance value of the resistance mutation element 1420, and the resistance value of the resistance gradient element 1410 is greater than the resistance value of the resistance mutation element 1420.

For example, when an applied voltage signal is less than the threshold voltage of the resistance gradient element 1410, the resistance value of the resistance gradient element and the resistance value of the resistance mutation element are hardly changed, the response current in the circuit structure is 0, and no signal is transmitted at this time; when the applied voltage signal is greater than the threshold voltage of the resistance gradient element 1410 and is applied to the circuit structure as shown in FIG. 3, in an initial stage, the applied voltage signal is almost entirely applied to the resistance gradient element 1410, therefore, the resistance value of the resistance gradient element 1410 decreases slowly, and the response current in the entire circuit structure increases slowly; when the resistance value of the resistance gradient element 1410 decreases to a certain extent, for example, when the resistance value of the resistance gradient element 1410 is not significantly different from the resistance value of the resistance mutation element 1420, or the resistance value of the resistance gradient element 1410 is less than the resistance value of the resistance mutation element 1420, partial voltage on the resistance gradient element 1410 will transfer to the resistance mutation element 1420, so that the resistance value of the resistance mutation element 1420 will suddenly decreases sharply, and the current in the entire circuit structure is suddenly increased, thus forming a rising pulse current, which can be transmitted. In this process, the applied voltage signal is mostly applied to the resistance gradient element 1410, and the slow changing process of the current in the circuit structure corresponds to an integration stage; the applied voltage signal is transferred to the resistance mutation element 1420, and the sudden increase process of the current in the circuit structure corresponds to an emission stage. Therefore, the grouping, filtering, integration and emission functions of a neuron is realized.

For example, when the response current is emitted to a next neuron layer, the applied voltage signal is removed, and the resistance values of the resistance gradient element 1410 and the resistance mutation element 1420 are quickly restored to an initial resistance state. The restoring time is in a magnitude of milliseconds, which depends on factors such as the value and the duration time of the applied voltage applied to the resistance gradient element 1410 and the resistance mutation element 1420, and the value of the applied voltage is larger, the restoring time is shorter. For example, the restoring time of the resistance mutation element 1420 provided by the embodiments of the present disclosure is less than 1 s.

For example, as shown in FIG. 2A, the n-th neuron layer and the (n+1)th neuron layer can be connected by a synapse unit 15. For example, in the present embodiment, the synapse unit 15 can comprise a memristor array. For example, the memristor array can be a two-terminal memristor array as shown in FIG. 6.

Figure 6:
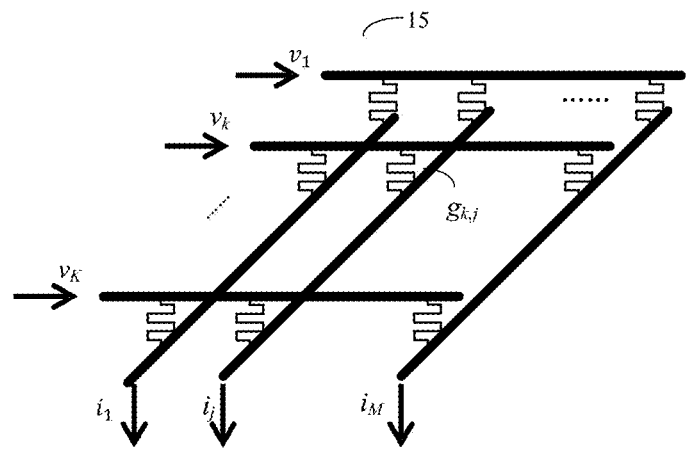
FIG. 6 is a schematic diagram of a memristor array of the neural network 10 as shown in FIG. 2A.

Specifically, according to Kirchhoff's law, an output current of the memristor array as shown in FIG. 6 can be obtained according to the following formula:

$$i_j = \Sigma_{k=1}^{M}(v_k g_{k,j})$$

where j=1, . . . , M, k=1, . . . , K.

In the above formula, $v_k$ denotes an excitation voltage inputted by an neuron node k in an input layer, $i_j$ denotes an output current of an neuron node j in a next layer, and $g_{k,j}$ denotes a conductance matrix of the memristor array.

Figure 7A:
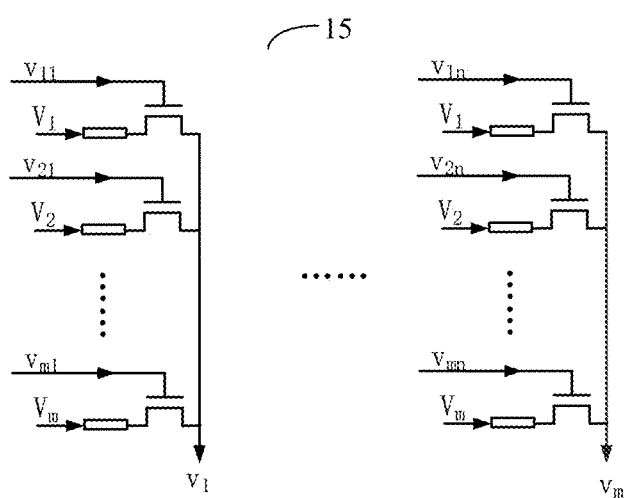
FIG. 7A is a schematic diagram of another memristor array of the neural network 10 as shown in FIG. 2A.
Figure 7B:
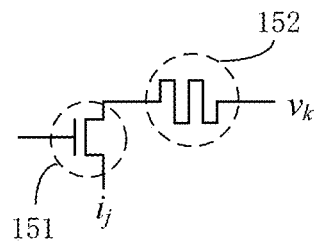
FIG. 7B is connection diagram of one memristor unit of the memristor array as shown in FIG. 7A.

For example, the memristor array can also be a memristor array as shown in FIG. 7A. For example, as shown in FIG. 7A, the memristor array can comprise a plurality of memristor units. For example, as shown in FIG. 7B, each memristor unit comprises a transistor 151 and a memristor 152. For example, each memristor unit can also be a structure comprising a selector and a memristor. For example, source electrodes of each row of transistors in the memristor array are connected by a source line, gate electrodes of each column of transistors are connected by a word line, and top electrodes of each column of memristors are connected by a bit line. For example, as shown in FIG. 7A and FIG. 7B, by inputting excitation voltages in parallel on bit lines, and inputting a high or low level on each word line to control a corresponding memristor to be turned-on, output voltages on the source lines, which are obtained by dividing voltages by the input vector and the conductance matrix of the memristor array, can be obtained. The output voltages are transmitted as input signals of the dendrite units. For example, the transistor can be an N-type transistor or a P-type transistor. For example, if the transistor is an N-type transistor, it can be turned on by a high level; if the transistor is a P-type transistor, it can be turned on by a low level turns.

For example, in the memristor array as shown in FIG. 7A, by connecting the transistor 151 in series with one terminal of the memristor 152, crosstalk generated during data reading and writing of the synapse unit 15 can be effectively suppressed, and the memristor array can be provided with an anti-breakdown protection during data writing.

Figure 8A:
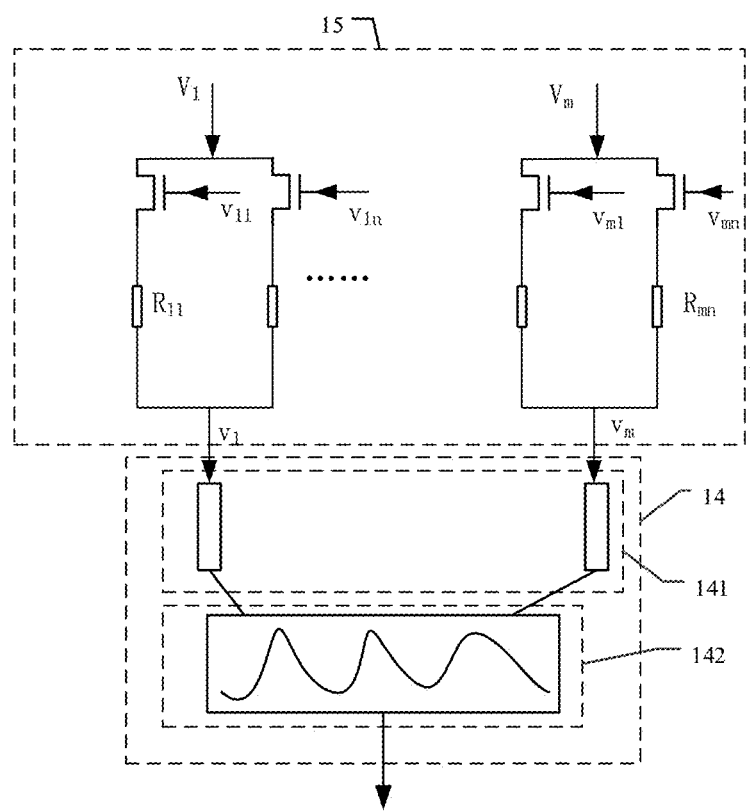
FIG. 8A is a circuit structure diagram of the neural network 10 as shown in FIG. 2A.
Figure 8B:
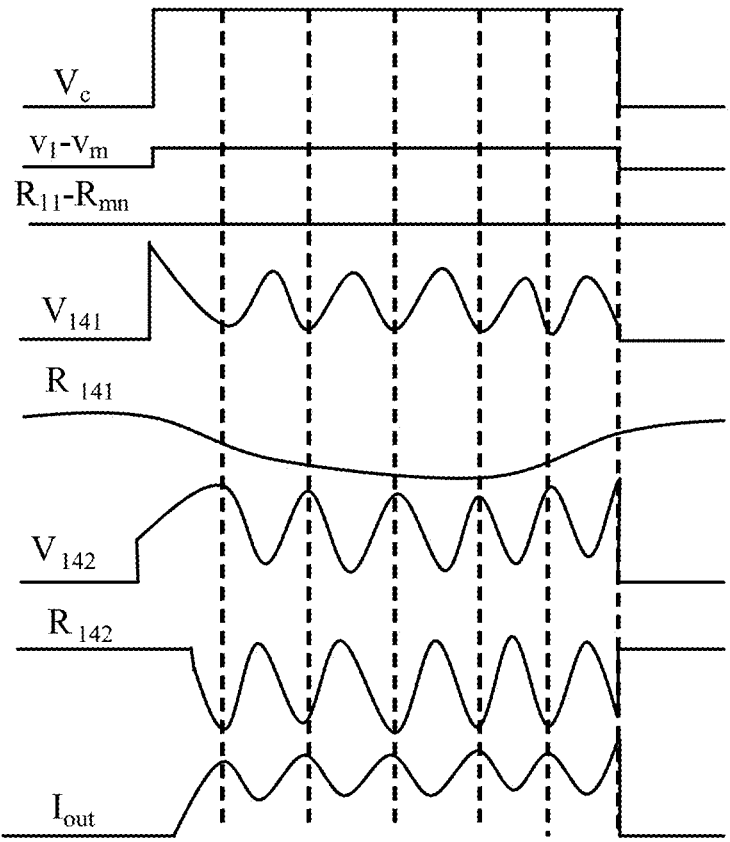
FIG. 8B is an operation timing chart of the circuit structure as shown in FIG. 8A.

FIG. 8A shows a circuit structure diagram of the neural network 10 as shown in FIG. 2A. FIG. 8B shows an operation timing chart of the circuit structure. As shown in FIG. 8A, the synapse unit 15 adopts a memristor array as shown in FIG. 7A. For example, voltage signals $v_{11}, \ldots, v_{mn}$ are high or low pulse signals that control corresponding transistors in the memristor array to be turned on, $R_{11}, \ldots, R_{mn}$ are memristors. For example, in the present embodiment, the transistor can be an N-type transistor, which is turned on by a high level. For example, voltage signals $V_1, \ldots, V_m$ are input signals of the memristor array (i.e., the synapse unit 15), and $v_1, \ldots, v_m$ are input signals of the neurons 14 formed after the voltage signals V1, . . . , Vm pass through the memristor array. For example, the input signals $v_1, \ldots, v_m$ can be distributed to the m dendrite units. For example, the waveforms of the input voltages V1, . . . , Vm of the synapse unit 15 are waveform Vc as shown in FIG. 8B. For example, after the input signals $v_1, \ldots, v_m$ of the neuron 14 are respectively transmitted to the dendrite units 141, a resistance change $R_{141}$ and an output voltage signal $V_{141}$ of a corresponding resistance gradient element 1410 are shown in FIG. 8B, and the output signal of the dendrite unit 141 is inputted to the soma unit 142. For example, a resistance change $R_{142}$ and an output voltage signal $V_{142}$ of the resistance mutation element 1420 are shown in FIG. 8B. Finally, when the resistance value of the resistance mutation element 1420 is abruptly changed, a current signal Iout is emitted to the axon unit (not shown in FIG. 8A). The axon unit converts the current signal Iout into a corresponding voltage signal and sends it to the synapse unit 15 of a next layer.

Figure 9:
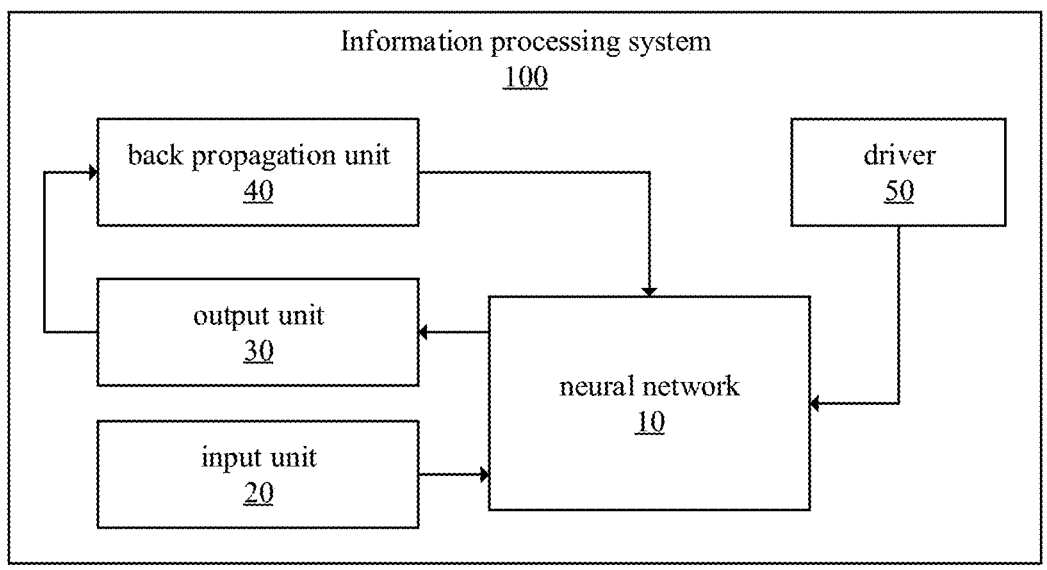
FIG. 9 is a schematic block diagram of an information processing system provided by some other embodiments of the present disclosure.

An embodiment of the present disclosure provides an information processing system 100 comprising the neural network 10 described above. FIG. 9 shows a schematic block diagram of the information processing system 100.

For example, as shown in FIG. 9, the information processing system 100 comprises: one or more processors (not shown), one or more memories (not shown), an input unit 20, an output unit 30, a back propagation unit 40 and a driver 50. For example, these components are interconnected by a bus system (not shown) and/or coupling mechanisms (not shown) of other forms. It should be noted that the components and structures of the information processing system 100 as shown in FIG. 9 are merely illustrative, and not restrictive, and the information processing system 100 can also have other components and structures as needed.

For example, the processor can be a central processing unit (CPU) or other form of processing unit having data processing capabilities and/or instruction execution capabilities. The processor can be a general purpose processor or a dedicated processor, and can control other components in the information processing system 100 to perform a desired function. The memory can comprise one or more computer program products, which can comprise various forms of computer readable storage media, such as a volatile memory and/or a non-volatile memory. The volatile memory can comprise, for example, a random access memory (RAM) and/or a cache, etc. The non-volatile memory can comprise, for example, a read-only memory (ROM), a hard disk, a flash memory, etc. One or more computer program instructions can be stored on the computer readable storage medium, and the processor can execute the program instructions to implement the functions (implemented by the processor) of the embodiments of the present disclosure and/or other desired functions, such as a nonlinear filtering operation. Various applications programs and various data, such as image data and various data used and/or produced in the application programs, etc., can also be stored in the computer readable storage medium.

For example, the computer readable storage medium can be any combination of one or more computer readable storage media, and for example, one computer readable storage medium includes a computer readable program code for the nonlinear filtering operation, and another computer readable storage medium includes a computer readable program code for computing the output signal. For example, when the program code is read by a computer, the computer can execute the program code stored in the computer storage medium to perform an operation method such as the operation method of the nonlinear filtering operation provided by any one embodiment of the present disclosure.

For example, the computer readable storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a USB memory, or any combination of the above storage media, or any other suitable storage medium.

For example, the input unit 20 is connected to the input layer 11 of the neural network 10, and is configured to process data signals into input signals required by the neural network 10. For example, the data signals may be an image signal, a speech signal, etc., and the input unit 20 can convert the image signal into a gray matrix that can be recognized by the neural network 10 as the input data. For example, the input unit 20 can be implemented by, for example, hardware, software, firmware, or any combination thereof. For example, the input unit 20 may include a plurality of DACs (digital-to-analog converters), which convert digital signals into analog signals, such as voltage signals.

For example, the output unit 30 is connected to the output layer 13 of the neural network 10 and the back propagation unit 40, and is configured to process an output outputted by the neural network 10 and send a process result to the back propagation unit 40. For example, the output unit 30 can be implemented by, for example, hardware, software, firmware, or any combination thereof. For example, the output unit 30 can perform a discretization processing operation on the output of the neural network 10 by an ADC (analog-to-digital converter), that is, convert the output into a digital signal, and transmit the digital signal to the back propagation unit 40.

For example, the back propagation unit 40 is connected to the neural network 10 and the output unit 30, and is configured to optimize parameters of the synapse unit 15 of the neural network 10. For example, in the present embodiment, the back propagation unit 40 is configured to optimize the conductance of the memristor in the memristor array. For example, the back propagation unit 40 can be implemented by, for example, hardware, software, firmware, or any combination thereof.

For example, the driver 50 is connected to the neural network 10, and is configured to apply voltage signals to the neural network 10 via signal lines. For example, high or low pulse signals, which control the transistors in the memristor array are turned on or off, are applied to the neural network 10 by the driver 50. For example, the driver can be implemented by, for example, hardware, software, firmware, or any combination thereof.

It should be noted that, the specific structures and implementations of each above unit can be implemented by various existing feasible solutions, such as software, hardware, firmware, or any combination thereof, and no limitation is imposed to this aspect herein.

Figure 10:
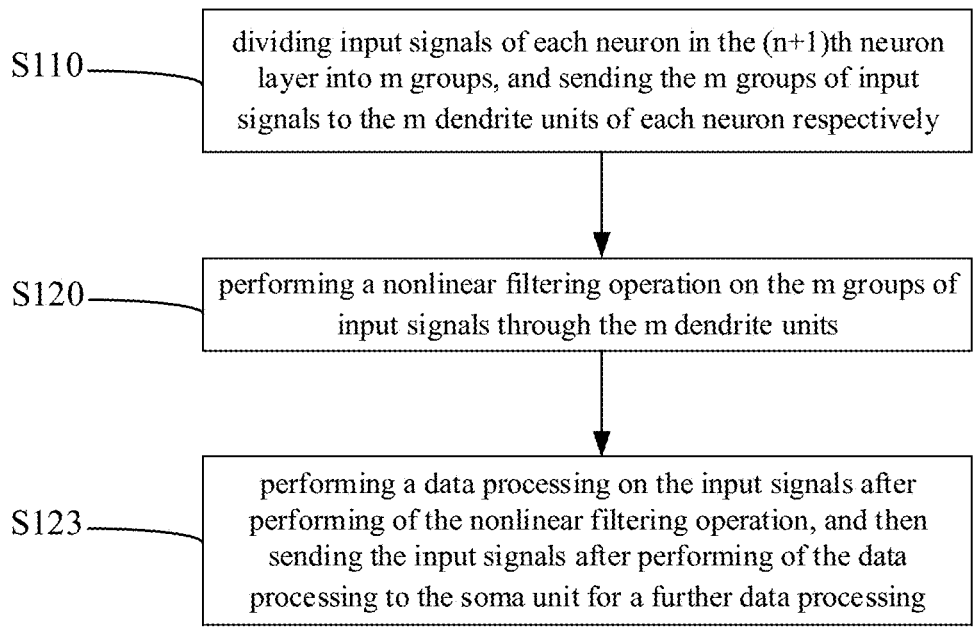
FIG. 10 is a flowchart of an information processing method of the neural network 10 as shown in FIG. 2A.

An embodiment of the present disclosure further provides an information processing method of the neural network 10. As shown in FIG. 10, the information processing method comprises step S110 to step S130. Hereinafter, the information processing method provided by the embodiment of the present disclosure will be described with reference to FIG. 10.

It should be noted that, this information processing method can be executed by the neural network 10. Because the details of each operation in the information processing method are substantially the same as the processing method of the neural network 10 described above with respect to FIG. 2A, in order to avoid repeat, descriptions of the same details are omitted while the operation steps of the information processing method are described below.

Step S110: dividing input signals of each neuron in the (n+1)th neuron layer into m groups, and sending the m groups of input signals to the m dendrite units of each neuron respectively.

For example, the input signals of each neuron in the (n+1)th neuron layer can be voltage signals computed by the synapse unit 15. For example, the input signal can be divided into m groups, equally or unequally, and respectively sent to the m dendrite units 141, thereby processing the input signals in groups is realized, thus improving the efficiency of signal processing of the neural network 10.

For example, as shown in FIG. 2A, the first neuron layer comprises, for example, q (q is an integer greater than 1) neurons 14, and then each neuron 14 in the second neuron layer can comprises q input signals. For example, the q input signals can be equally distributed to the m dendrite units 141. As shown in FIG. 2A, for example, two input signals can be distributed to each dendrite unit, then the first dendrite unit 141 can be connected with a first neuron 14 and a second neuron 14 in the first neuron layer, the second dendrite unit 141 can be connected with a third neuron 14 and a fourth neuron 14 in the first neuron layer, and so on, the m-th dendrite unit 141 can be connected with an (q−1)th neuron 14 and an q-th neuron 14 in the first neuron layer. It should be noted that, this is not limited in this aspect. For example, the number of input signals distributed to each dendrite unit can also be different. For example, the first dendrite unit 141 can be connected with three neurons in a previous neuron layer, and the second dendrite unit 141 can be connected with two neurons in the previous neuron layer, etc. The number of input signals of each dendrite unit is depended on a specific situation and is not limited herein.

Step S120: performing a nonlinear filtering operation on the m groups of input signals through the m dendrite units.

For example, the dendrite unit 141 comprises a resistance gradient element 1410. For example, the m dendrite units 141 can be set with different threshold voltages or currents (i.e., the nonlinear coefficient a) respectively, to achieve filtering the input signals with different intensities by different dendrite units.

Step S130: performing a data processing on the input signals after performing of the nonlinear filtering operation, and then sending the input signals after performing of the data processing to the soma unit for a further data processing.

For example, in an example, the outputs of the m dendrite units can conform to the following function:

$$y = \begin{cases} x, & a = 0 \\ \dfrac{e^{ax} - 1}{e^a - 1}, & a > 0 \end{cases}$$

where a denotes the nonlinear coefficient, which is the threshold voltage or current of the dendrite unit 141.

For example, the output signal y of the dendrite unit 141 is transmitted to the soma unit 142. For example, the soma unit 142 comprises a resistance mutation element 1420.

For example, in an example, the output oscillation frequency of the soma unit conforms to the following function:

$$y = \begin{cases} 2 * \text{sigmoid}(x - c) - 1, & x > c \\ 0, & x \leq c \end{cases}$$

where c denotes the threshold voltage or current of the soma unit 142.

For example, a voltage signal is applied to the resistance mutation element 1420, the resistance value of the resistance mutation element 1420 remains substantially unchanged until the voltage signal reaches a threshold voltage c of the resistance mutation element 1420, and when the voltage signal reaches the threshold voltage c, the resistance value of the resistance mutation element 1420 changes abruptly. For example, the conductance of the resistance mutation element is suddenly increased, so that the response current of the soma unit suddenly increases, thus forming a rising pulse current. For example, the axon unit converts the pulse current into a corresponding voltage signal through a corresponding circuit structure, and sends the voltage signal to the synapse unit 15 of a next neuron layer and to the next neuron layer.

For example, the information processing method further comprises: after the dendrite units perform the data processing, turning off the input signals to restore the dendrite units and the soma unit to respective initial states. For example, when the applied voltage signal is removed, the resistance values of the resistance gradient element 1410 and the resistance mutation element 1420 are restored to the initial resistance state gradually, and the response current in the circuit decreases gradually, thus realizing a decay function of neurons.

Figure 11:
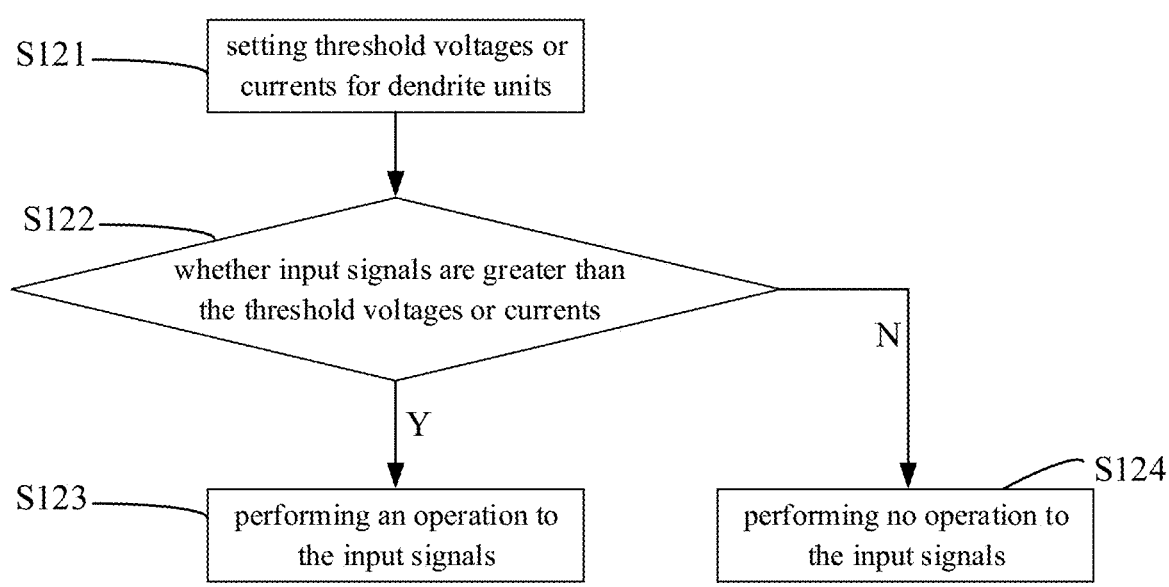
FIG. 11 is a flowchart of a nonlinear filtering operation in the information processing method as shown in FIG. 10.

FIG. 11 shows a flowchart of a nonlinear filtering operation in the information processing method provided by an embodiment of the present disclosure. That is, FIG. 11 is an operation flowchart of an example of step S120 as shown in FIG. 10.

As shown in FIG. 11, the nonlinear filtering operation provided by the present embodiment comprises step S121 to step S124.

Step S121: setting threshold voltages or currents for the m dendrite units respectively.

For example, step S123 can be achieved by setting the nonlinear coefficient a. For example, after the outputs of the previous neuron layer are grouped and sent to the dendrite units of each neuron in a next neuron layer, the function of filtering data with different intensities according to different requirements is realized by setting the nonlinear coefficient a of the dendrite unit at different locations and at different times.

Step S122: determining whether the input signals are greater than the threshold voltages or currents; if yes, execute step S123; if not, execute step S124.

For example, in the present embodiment, the input signal can be a voltage signal derived from the memristor array. For example, when the voltage signal is less than the threshold voltage of the resistance gradient element, the resistance value of the resistance gradient element remains unchanged, and at this time, the response current of the circuit unit is small (almost 0 A), and the circuit unit does not transmit a signal (that is, the response current); when the voltage signals are greater than the threshold voltages of all the resistance gradient elements, the resistance values of all the resistance gradient elements decrease gradually, and at this time, the response current generated by the circuit unit is large, the circuit unit starts transmitting the signal. That is to say, a voltage signal less than the threshold voltage of the resistance gradient element is blocked, so that the circuit unit can implement the function of filtering the voltage signal.

Step S123: performing an operation to the input signals.

For example, when the voltage signals are greater than the threshold voltages of all the resistance gradient elements, the resistance values of all the resistance gradient elements decrease gradually. At this time, the circuit unit performs an integration operation on the voltage signals, and generates a large response current. The circuit unit starts transmitting a signal, which is transmitted to the soma unit 142 for a further processing.

Step S124: performing no operation to the input signals.

For example, when the voltage signals are less than the threshold voltages of the resistance gradient elements, the resistance value of the resistance gradient elements remain unchanged. At this time, the circuit unit performs no operation, and generates a small response current (almost 0 ⍰ A). The circuit unit does not transmit a signal (the signal is a response current), that is, voltage signals less than the threshold voltages of the resistance gradient element are blocked, so that the circuit unit can implement the function of filtering the voltage signals.

It should be noted that, in the embodiments of the present disclosure, at least some steps of the information processing method of the neural network can be implemented by software, hardware, firmware, or any combination thereof. Also, the process flow of the information processing method of the neural network can include more or fewer operations, which can be executed serially or in parallel. Although the process flow of the training method described above includes a plurality of operations that appear to occur in a specific order, it should be clearly understood that the order of the plurality of operations is not limited. The information processing method described above may be performed once, or may be performed multiple times according to predetermined conditions. For example, if the input signals are always greater than the threshold voltages or currents, step 123 continues to be executed.

The neural network, the information processing method and the information processing system provided by the embodiments of the present disclosure can set different threshold parameters according to different requirements, so as to filter out information irrelevant to the target task, thereby decreasing the amount of information processing of the neural network, reducing power consumption when the neural network is operated, and improving processing efficiency of the neural network for critical information.

What have been described above are only specific implementations of the present disclosure, the protection scope of the present disclosure is not limited thereto. Therefore, the protection scope of the present disclosure should be based on the protection scope of the claims.

What is claimed is:

1. A neural network circuit, comprising:
N neuron layers connected one by one, wherein except for a first neuron layer, each neuron in other neuron layers comprises m dendrite units and one soma unit;
wherein the dendrite units each comprises a capacitor and a diode in series and a resistance gradient element, the soma unit comprises a resistance mutation element and an oscillating circuit, and the m dendrite units are configured with different threshold voltages or currents respectively; and
neurons in an n-th neuron layer are respectively connected to the m dendrite units of each neuron in an (n+1)th neuron layer;
wherein N is an integer greater than or equal to 2, m is an integer greater than 1, n is an integer greater than or equal to 1 and less than N;
wherein outputs of the m dendrite units conform to the following function:

$$y = \begin{cases} x, & a = 0 \\ \dfrac{e^{ax} - 1}{e^a - 1}, & a > 0 \end{cases}$$

where a denotes a nonlinear coefficient, which comprises a threshold voltage or current of the dendrite unit; x represents an input of the m dendrite units, and y represents the outputs of the m dendrite units.

2. The neural network circuit according to claim 1, wherein the m dendrite units are connected in various series-parallel connection, and then connected in series with the soma unit.

3. The neural network circuit according to claim 1, wherein an output oscillation frequency of the soma unit conforms to the following function:

$$y = \begin{cases} 2*\text{sigmoid}(x-c)-1, & x > c \\ 0, & x \leq c \end{cases}$$

where c denotes a threshold voltage or current of the soma unit, the sigmoid function is defined as:

$$g(z) = \frac{1}{1+e^{-z}}$$

where $z = x - c$.

$x_1$ represents an input of the soma unit, and $y_1$ represents the output oscillation frequency of the soma unit.

4. The neural network circuit according to claim 1, wherein the n-th neuron layer is connected to the (n+1)th neuron layer by a synapse unit.

5. The neural network circuit according to claim 4, wherein the synapse unit comprises a memristor array.

6. An information processing system, comprising: the neural network circuit according to claim 1, an input circuit, an output circuit, and at least one hardware processor;
   wherein the input circuit is configured to process data signals into input signals required by the neural network circuit;
   the output circuit is configured to process an output outputted by the neural network circuit and send a process result to the at least one hardware processor; and
   the at least one hardware processor is configured to optimize parameters of a synapse unit of the neural network circuit and to apply voltage signals to the neural network circuit via signal lines.

7. An information processing method for the neural network circuit according to claim 1, comprising:
   dividing input signals of each neuron in the (n+1)th neuron layer into m groups, and sending the m groups of input signals to the m dendrite units of each neuron respectively;
   performing a nonlinear filtering operation on the m groups of input signals through the m dendrite units; and
   performing a data processing on the input signals after performing of the nonlinear filtering operation, and then sending the input signals after performing of the data processing to the soma unit for a further data processing.

8. The information processing method according to claim 7, wherein the nonlinear filtering operation comprises:
   setting threshold voltages or currents for the m dendrite units respectively;
   in a case where the input signals are greater than the threshold voltages or currents, performing an operation to the input signals; and
   in a case where the input signals are less than the threshold voltages or currents, performing no operation to the input signals.

9. The information processing method according to claim 7, further comprising:
   after the soma unit performs the data processing on outputs of the dendrite units, transmitting signals to an (n+2)th neuron layer through an axon unit.

10. The information processing method according to claim 7, further comprising:
    after the dendrite units perform the data processing, turning off the input signals to restore the dendrite units and the soma unit to respective initial states.

11. The information processing method according to claim 7, further comprising:
    computing input signals of each neuron in the (n+1)th neuron layer through a synapse unit.

* * * * *